June 18, 1957    J. J. LAWSER    2,796,492
ADJUSTABLE THERMOSTATIC CONTROL MECHANISM
Filed Dec. 31, 1954
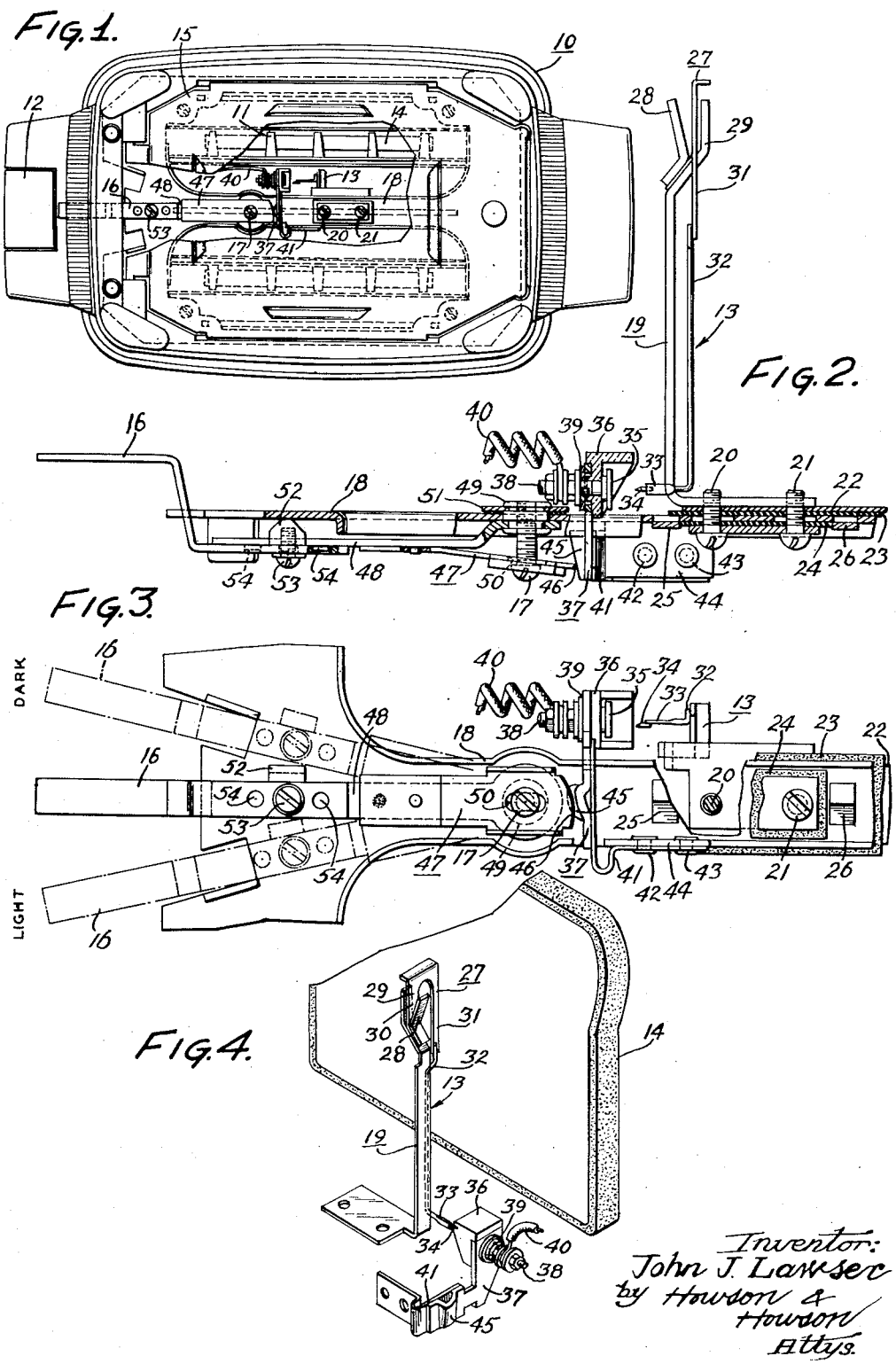
Inventor:
John J. Lawser
by Howson & Howson
Attys.

United States Patent Office 2,796,492
Patented June 18, 1957

2,796,492

ADJUSTABLE THERMOSTATIC CONTROL MECHANISM

John J. Lawser, Abington, Pa., assignor to Proctor Electric Company, Philadelphia, Pa., a corporation of Pennsylvania Application December 31, 1954, Serial No. 479,003

9 Claims. (Cl. 200—139)

The present invention relates to adjustable thermostatic control mechanisms, and more particularly to such a control mechanism for use in an electric bread toaster.

It has been found desirable, in designing a thermostatic control mechanism for an electric toaster, to provide two types of adjustment. One of these is an adjustment by which the user can select the desired degree of toasting as controlled by the thermostat. This is usually referred to as the color selector. In most instances, an indicia scale is provided so that the user can preselect colors ranging from very light to very dark, according to the user's preference. The other type of adjustment is referred to as the zeroing adjustment. This adjustment is usually made at the factory, but in some instances if necessary it can be made by the user. This adjustment in effect calibrates the thermostat or sensing device so that any setting of the color selector will accurately correspond to a degree of toasting typical of a particular color selected. Thus, it may be found, upon testing a toaster after assembly in the factory, that the light setting of the color selector provides rather dark toast. By manipulating the zeroing adjustment, light color toast will be provided at the light setting.

While the zeroing adjustment is normally a procedure performed at the factory, it is not unusual for the color of the toast to fail to correspond to that selected on the color selector. It is, therefore, desirable that the user, by a very simple adjustment, be able to correct the thermostat switch so that the indicia scale reads true.

It is a prime object of this invention to provide a toaster thermostat adjusting mechanism that will provide both a color selector control and a zeroing adjustment wherein the latter is extremely easy and simple to operate.

A further object of the invention is to provide a thermostat adjustment mechanism that will involve a minimum number of parts and be economical in production.

Other objects of the invention will be apparent from the description to follow.

In the accompanying drawing:

Fig. 1 is a bottom view of a bread toaster with a portion of the crumb tray broken away to show the thermostat mechanism;

Fig. 2 is a view, partly in side elevation and partly in section, of the thermostat and adjustment mechanism;

Fig. 3 is an enlarged bottom view of the thermostat and adjustment mechanism; and Fig. 4 is a perspective showing the relative location of the bread thermostat and the bread slice being toasted.

In Fig. 1, the thermostat adjusting mechanism provided by this invention is shown embodied in a toaster 10 of the two-well type. The present invention is not concerned with the details of the toaster which may be of any suitable character. Structural details of the particular toaster shown are disclosed and claimed in the copending application of Hild et al., Serial No. 440,118, filed January 6, 1955, and in my copending application, Serial No. 479,004, filed December 31, 1954. In this particular toaster, the bread carriage 11 is manually lowered by means of knob 12 and is latched in the toasting position, and an electromagnet (not visible) is subsequently energized to release the bread carriage. This release action is under control of the bread-sensitive thermostat 13 which responds to the surface temperature of a bread slice 14 and functions through the mechanism hereinafter described to close an energizing circuit for the electromagnet.

It should be noted further that the bottom of the toaster is closed by a removable crumb tray 15 above which the adjusting mechanism is located.

To adjust for the preferred degree of toasting, the operator moves a color selector finger piece 16. If a zeroing adjusting is desired, either in the factory or in the home, the operator merely turns a screw 17 which is accessible through a hole in the crumb tray 15. As will appear later, turning of the screw 17 a predetermined amount in either direction causes a predetermined shifting or zeroing of the color selector control.

As shown in Figs. 1, 2 and 3, the bread sensitive thermostat 13 is mounted on a central channel support 18 which forms part of the chassis of the toaster 10. The thermostat itself comprises an L-shaped support arm 19, which is held by screws 20 and 21 into engagement with bus bar 22. It is, however, insulated from the channel 18 by an upper insulating strip 23 and a lower insulating strip 24. The lower strip 24 is located between ears 25 and 26 lanced in the channel 18 so as to locate thermostat 13 on said channel. Welded to the top of the support arm 19 are a U-shaped bimetal 27 and the shield element 28. An extension 29 of support 19 acts as a shield to complement the shield 28. The bimetal 27 has a relatively short but wide compensating leg 30 and a relatively long, narrow primary responsive leg 31. This structure represents an improvement of the thermostat disclosed and claimed in the W. H. Vogelsberg Patent No. 2,667,115, issued January 26, 1954. The improvements are claimed in the above-mentioned Lawser application.

The lower end of leg 31 of the thermostat has secured thereto an L-shaped extension 32. The lower end of this extension terminates in a swedged portion 33 to which is welded a small diameter wire 34 that serves as a switch contact. The wire is preferably made from platinum of approximately .015" diameter and is sheared to provide a sharp point at its free end. In response to primary heat from the bread slice, leg 31 of the thermostat, having its high expansion side disposed toward the right in Fig. 2, will effect motion of contact 34 toward the left. When the bread slice is toasted to the desired degree, the thermostat will cause the contact 34 to engage a cooperating relatively stationary contact 35, made preferably of silver. The contact 35 is protected by a porcelain shield 36 which is secured to a rigid metallic support 37. The contact 35 is provided with a threaded extension 38 for securing the assembly of the contact and porcelain shield to the support 37. The contact is insulated from the metallic support by a shoulder on the porcelain shield and by an insulating washer 39. The threaded extension 38 also serves as a connection terminal for a wire 40. The bus bar 22 and wire 40 are included in the energizing circuit for the solenoid which releases the bread carriage, so that closure of contacts 34 and 35 terminates the toasting operation.

Support 37, as clearly shown in Fig. 4, is in the form of an L-shaped member and is securely fastened, as by spot-welding, to a leaf spring member 41. The latter, as shown in Figs. 2 and 3, is secured through rivets 42 and 43 to an extension 44 of the channel support 18, and is biased to bear toward the left in Figs. 2 and 3. A cam follower lobe 45 on support 37 is engaged by a manually operable cam 46. The cam follower 45 has a vertically inclined or sloping face, while the cam 46 has a narrow face which extends transversely of the inclined face of follower 45. The purpose of this will appear presently. Cam 46 is preferably formed on a spring steel member 47 which has the cam contour formed therein during the stamping process. This member is secured, as by spot-welding, to an arm 48 which is pivotally mounted on channel support 18 by means of hollow rivet 49 which is rotatably supported on support 18. The spring cam member 47 is pre-biased downwardly, as viewed in Fig. 2, and is slotted at 50 to receive the adjusting screw 17. This screw threads into the hollow rivet 49 which constitutes the pivotal support for arm 48. To assure that the rivet 49 does not rotate relative to the arm 48, the rivet is staked thereto. Shown at 51 are washers associated with the hollow rivet, one of which is a spring washer to provide predetermined frictional resistance to the pivotal movement of arm 48. This arm is pre-biased so that it tends to bear against channel support 18 through extension 52 formed on said arm. The finger piece 16 for color selection is secured to arm 48 by a screw 53 and by bosses 54 formed on arm 48.

In normal selection of color, the operator will move the finger piece 16 to the right or left, pivoting the cam 46 about the pivotal axis provided by rivet 49. This effects engagement of different portions of the cam face with the same portion of the inclined face of follower 45, and thus effects adjustment of contact 35 due to the shape of the cam face. Movement of the finger 16 in the "dark" direction, as seen in Fig. 3, will cause clockwise rotation of the cam 46 with resulting movement of the contact 35 toward the left due to the biasing action of spring 41. The movement of contact 35 toward the left will result in selection of darker toast. Movement of finger 16 in the "light" direction, as seen in Fig. 3, will select lighter toast because contact 35 will be moved closer to contact 34 and less movement of the latter will be required to close the contacts.

If, however, the toast as controlled by the thermostat does not correspond in color to the marking on the indicia scale associated with finger 16, adjustment is made through screw 17 to move the cam 46 vertically to a new position in relation to cam follower 45. This effects engagement of the narrow face of cam 46 with a different portion of the inclined face of follower 45, and thus effects adjustment of contact 35 due to the inclination of the face of follower 45. If the toast resulting from the lightest setting of finger 16 is too dark, adjusting the screw 17 upwardly moves contact 35 closer to contact 34, thus giving a lesser degree of toasting for the color setting of finger 16. On the other hand, if the toast resulting from the lightest setting is too light, screw 17 is adjusted downwardly to cause contact 35 to move farther away from contact 34, thus giving a greater degree of toasting for the setting of finger 16.

In practice, the crumb tray 15 may be marked so that the user, by merely reading the instructions, will know that a predetermined turning of the screw 17 in a particular direction will result in a specific change in lightness or darkness of the toast.

From the foregoing description, it will be seen that the invention provides means for adjusting the contact 35 comprising two mutually engaging relatively adjustable elements one of which has an inclined or sloping face and the other of which has a narrow cam face extending transversely of said inclined face; and the invention further provides means for effecting engagement of different portions of said cam face with one portion of said inclined face, and means for effecting engagement of said cam face with different portions of said inclined face. The invention contemplates any arrangement by which the relative adjustments of said mutually engaging elements may be accomplished. The particular arrangement illustrated is preferred but in a broad sense it is merely exemplary.

While a single embodiment of the invention has been illustrated and described, the invention is not limited thereto, but contemplates such modifications and other embodiments as may occur to those skilled in the art.

I claim:

1. In an adjustable thermostatic control mechanism, a switch comprising a thermostatically actuated first contact and a normally stationary adjustable second contact, means operatively associated with said second contact for adjusting the same, said means comprising two mutually engaging relatively adjustable elements one of which has an inclined or sloping face and the other of which has a narrow cam face extending transversely of said inclined face, means for effecting relative movement of said faces to adjust said mechanism by engagement of different portions of said cam face with a selected portion of said inclined face, and separate means for effecting relative movement to change the portion of said inclined face selected for engagement with said cam face in the course of said first mentioned relative movement.

2. In an adjustable thermostatic control mechanism, a thermostatically actuated first contact movable in a predetermined path, a normally stationary second contact in spaced opposed relation to said first contact to be engaged thereby, an adjustable element operatively connected to said second contact having a portion in inclined or sloping relation to said path, a manually adjustable cam member movable between defined limits to engage said portion through different portions of said cam member at a selected point along the slope of said portion to effect adjustment of said second contact toward or away from said first contact, and means operable at will to relatively adjust said member and said sloping portion so as to change the selected point of engagement therebetween along the slope of said portion, thereby to change the position of said second contact for a given adjustment of said member.

3. In an adjustable thermostatic control mechanism, a thermostatically-actuated first contact movable in a predetermined path, a normally-stationary second contact in spaced opposed relation to said first contact to be engaged thereby, a pivotally-adjustable element operatively connected to said second contact having a portion in inclined or sloping relation to said path, a manually-adjustable pivoted lever movable between defined limits, a cam member mounted on said lever for pivotal adjustment and engaging said portion at a point along the slope thereof to effect adjustment of said second contact toward or away from said first contact in response to adjustment of said lever, and manually-adjustable means for effecting pivotal movement of said cam member in a different plane from said pivotal adjustment so as to effect engagement thereof with a different point of said sloping portion, thereby to change the position of said second contact for a given adjustment of said lever.

4. A mechanism according to claim 3, including a pivotal spring mounting for said element, and a pivotal spring mounting for said cam member on said lever.

5. A mechanism according to claim 4, wherein the means for effecting pivotal movement of said cam member comprises an adjustment screw threaded into the pivot of said lever.

6. In a two-well bread toaster, a chassis having a central bottom rib of relatively narrow width, a thermostat mounted on said rib centrally of the toaster and insulated from said rib, a first contact carried by said thermostat for movement in a predetermined path, a second contact mounted on said rib in spaced opposed relation to said first contact to be engaged thereby, said second contact being insulated from said rib and being spring-biased away from said first contact, a manually-adjustable member pivotally mounted on said rib and extending from one end of the toaster for selection of toast color by the user, a thin-faced cam member pivotally mounted on said manual member, a cam follower operatively connected to said second contact having a portion in inclined or sloping relation to said path having a selected part engaged by the face of said cam member for positioning said second contact according to the adjustment of said manual member, and manually-adjustable means for changing the position of said cam member in relation to said portion to cause engagement of said cam member with a different selected part of said portion and thereby change the position of said second contact for a given adjustment of said manual member.

7. A bread toaster according to claim 6, wherein said manually-adjustable means comprises an adjustment screw threaded into the pivot of said manual member and engaging said cam member.

8. In an electric toaster, the combination comprising supporting means for the bread being toasted, a switch interconnected to the control circuit of the toaster to terminate the toasting operation when it has reached a degree of toasting previously selected by the operator, said switch including a movable contact and thermostatic means to control the movement of said contact in response to the progress of the toasting operation, a fixed but adjustable contact adapted to close said control circuit upon being contacted by said movable contact, and means for adjusting said fixed contact comprising a support on which said fixed contact is mounted, and plural means for adjusting the position of said support toward and away from said movable contact, said adjusting means comprising a member having a sloping face and a cam member, means for moving said cam member into different positions of adjustment to bring different portions of said cam member into contact with a pre-selected portion of said sloping face, and separate means for adjusting the relative positions of said sloping face and cam member to bring different portions of the slope of said sloping face into contact with said cam member.

9. An electric toaster as defined in claim 8, in which said means for moving said cam member includes an operating handle projecting into accessible position exteriorly of the toaster structure, and said separate means for adjusting the relative positions of said sloping face and cam member includes a screw accessible at the bottom of the toaster structure.

References Cited in the file of this patent
UNITED STATES PATENTS

| | | |
|---|---|---|
| 2,587,334 | Kronmiller | Feb. 26, 1952 |
| 2,611,855 | Turner | Sept. 23, 1952 |
| 2,669,925 | Rouse et al. | Feb. 23, 1954 |